(12) United States Patent
Morales Bolaños et al.

(10) Patent No.: US 10,916,137 B2
(45) Date of Patent: Feb. 9, 2021

(54) TRAFFIC MITIGATION SYSTEM

(71) Applicant: Ford Global Technologies, LLC, Dearborn, MI (US)

(72) Inventors: Hedy H. Morales Bolaños, Naucalpan (MX); Oswaldo Perez Barrera, Texcoco (MX); David Franco Lopez Rubio, Lerma (MX); Rodrigo Frieventh Cienfuegos, Toluca (MX)

(73) Assignee: Ford Global Technologies, LLC, Dearborn, MI (US)

( * ) Notice: Subject to any disclaimer, the term of this patent is extended or adjusted under 35 U.S.C. 154(b) by 146 days.

(21) Appl. No.: 16/109,484

(22) Filed: Aug. 22, 2018

(65) Prior Publication Data

US 2020/0066151 A1 Feb. 27, 2020

(51) Int. Cl.
*G01C 21/36* (2006.01)
*G01C 21/34* (2006.01)
*G08G 1/005* (2006.01)
*G08G 1/0968* (2006.01)

(52) U.S. Cl.
CPC ... *G08G 1/096805* (2013.01); *G01C 21/3423* (2013.01); *G01C 21/3469* (2013.01); *G01C 21/3484* (2013.01); *G01C 21/3492* (2013.01); *G01C 21/3691* (2013.01); *G08G 1/005* (2013.01)

(58) Field of Classification Search
CPC ............ G01C 21/3423; G01C 21/3469; G01C 21/3484; G01C 21/3492; G01C 21/3691; G08G 1/005
See application file for complete search history.

(56) References Cited

U.S. PATENT DOCUMENTS

| 8,855,903 | B2 | 10/2014 | Chiu |
| 9,105,185 | B2 | 8/2015 | Joglekar |
| 9,644,982 | B2 | 5/2017 | Kantarjiev et al. |
| 10,346,773 | B2* | 7/2019 | Anderson ............... H04W 4/02 |
| 2005/0096840 | A1 | 5/2005 | Simske |
| 2010/0082226 | A1* | 4/2010 | Mukherjee ........... G08G 1/0104 |
|  |  |  | 701/118 |
| 2014/0303888 | A1 | 10/2014 | Bouzid et al. |
| 2016/0076899 | A1* | 3/2016 | MacNeille ......... G08G 1/09685 |
|  |  |  | 701/428 |
| 2016/0097648 | A1 | 4/2016 | Hannah |

(Continued)

*Primary Examiner* — Fadey S. Jabr
*Assistant Examiner* — Naeem Taslim Alam
(74) *Attorney, Agent, or Firm* — Brandon Hicks; Eversheds Sutherland (US) LLP

(57) ABSTRACT

A device may determine driving routes and transit times for vehicles and drivers. The device may include memory and processing to determine one or more indications of desired departure times and routes for a first user and a second user of a group of users, the routes including a road segment used by the first user and the second user. The device may determine a first signal received from a computer of a first vehicle and a second signal received from a computer of a second vehicle, wherein the first signal indicates traffic associated with the first vehicle, and wherein the second signal indicates traffic associated with the second vehicle. The device may determine a first suggested departure time associated with the first user and a second suggested departure time associated with the second user The device may to send indications of the first and second suggested departure times.

20 Claims, 4 Drawing Sheets

(56) References Cited

U.S. PATENT DOCUMENTS

2016/0290816 A1* 10/2016 Bauer ................ G01C 21/3438
2016/0321764 A1    11/2016 Cardoso
2016/0360485 A1* 12/2016 McGavran ............ H04W 4/025
2017/0371333 A1* 12/2017 Nagy ................... G01C 21/343
2018/0348012 A1* 12/2018 An ..................... G01C 21/3469

* cited by examiner

TRAFFIC MITIGATION SYSTEM

FIELD OF THE INVENTION

This invention relates to providing navigation guidance to drivers and vehicles.

BACKGROUND OF THE INVENTION

Traffic congestion is a vehicular flow that is saturated due to the excess demand of the roads, producing increases in travel times and clogging of roads. Vehicular congestion often causes accidents, even though cars cannot drive at high speed, due frequent stops and starts and driver frustration leading to aggressive driving practices.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
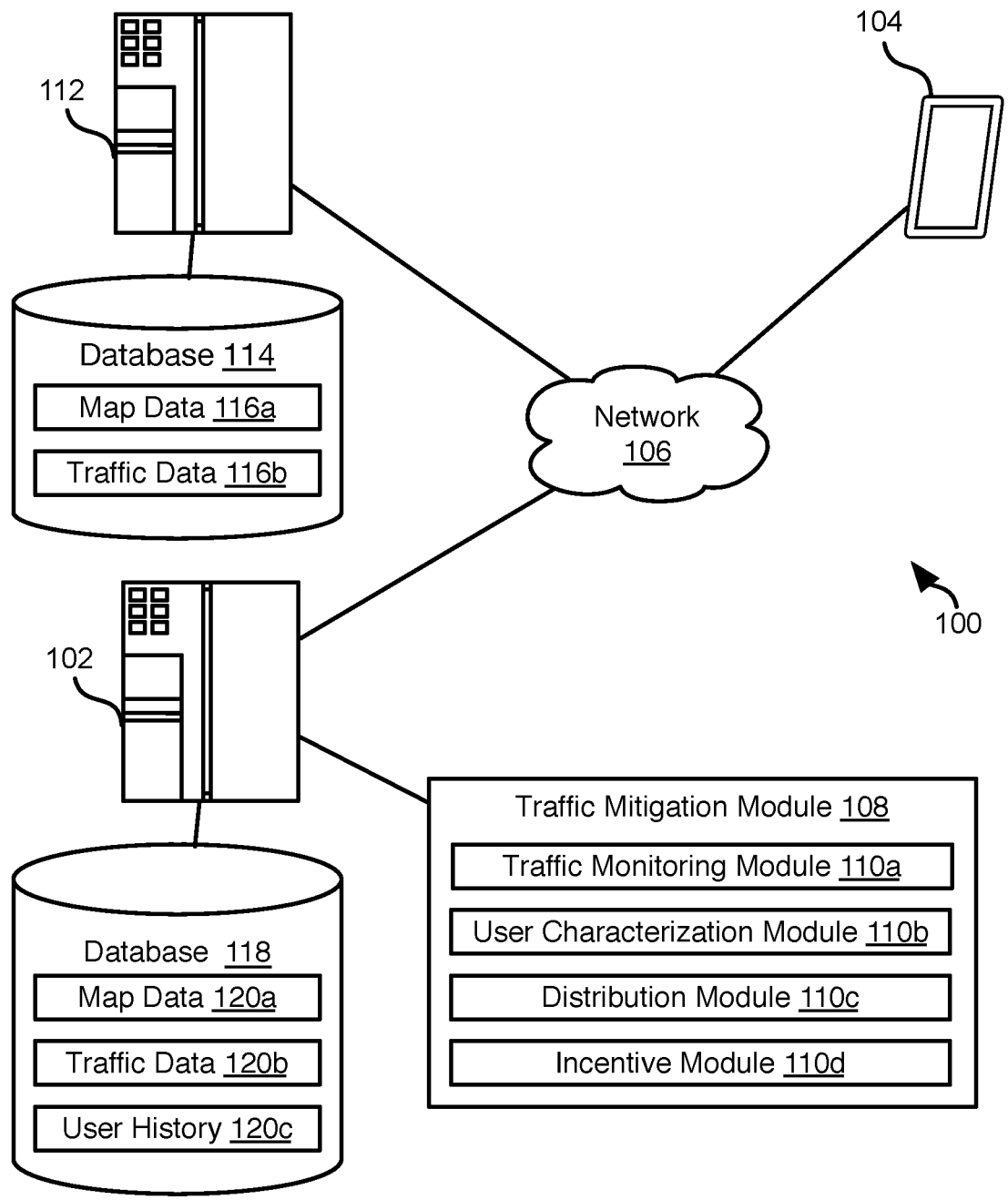
FIG. 1 is a schematic block diagram of components implementing a system, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Traffic congestion may be inconvenient for drivers, result in accidents, result in reduced gas mileage, result in increased pollution, and may otherwise be the cause of negative driving experience. Traffic congestion may be caused by a lack of information available to a driver and/or vehicle, resulting in drivers or vehicles taking inefficient driving routes at give times.

It may therefore be beneficial to provide computer-generated traffic routes for drivers and/or vehicles.

Example embodiments of the present disclosure relate to systems, methods, and devices for providing enhanced traffic instructions for a driver or vehicle.

In one or more embodiments, an application on a vehicle computer or user device may be used to generate driving routes for vehicles at a given time. The application may execute on a user device or computer device and may run concurrently with other traffic applications. For example, the application may receive traffic and map information from other applications executing on the device. The application may also facilitate vehicle-to-vehicle communication by connecting wirelessly with another vehicle computer. The application may collect traffic and environmental information, along with desired user inputs related to desired locations and departure times, from other applications on the device, from other vehicle computers, or from remote servers or databases.

In one or more embodiments, the application may allow a user to register. Registration may include the user providing vehicle and/or location information. The application may receive an indication of a user's location, whether from a user input or from location services (e.g., Global Positioning System services). The application may also receive biometric data (e.g., fingerprints, facial recognition data, retinal data, or the like), which may be used to verify a user. Biometric data may be used to authenticate a user. Biometric data may also include distance data such as pedometer data which may be used to determine walking distances to and from a vehicle.

In one or more embodiments, the application may receive one or more indications of a vehicle's location and one or more intended destinations. The application may analyze collected and/or real-time traffic data to determine driving routes designed to reduce traffic congestion and commute time.

In one or more embodiments, the application may receive one or more indications from a user regarding a time and distance for the user to a vehicle and/or from a vehicle to a desired location. The time and distance information may be used in determining the most efficient routes for the user and the vehicle.

In one or more embodiments, an application on a user device may communicate with an application on a vehicle computer. The applications may communicate relevant user, vehicle, and traffic data. The vehicle computer may also indicate to the user device when the vehicle computer is on or off.

In one or more embodiments, the application may determine driving routes and times associated with the routes. For example, the application may provide instructions to a device to indicate to a user when to use a particular driving route. Different times may be recommended for different driving routes. For example, the application may indicate that a first route may be best to use at one time, and that a second route may be best to use at a different time. The times may depend on a time and distance associated with a user arriving at and starting the vehicle.

The embodiments disclosed herein may allow for providing enhanced traffic instructions for a driver or vehicle.

Referring to FIG. 1, the methods disclosed herein may be performed using the illustrated system 100. The methods disclosed herein may be implemented by a server system 102 in combination with some or all of the other illustrated components. In particular, the server system 102 may communicate with a user device 104, which may be embodied as a mobile phone, tablet computer, wearable computer, notebook computer, laptop computer, desktop computer, or any other computing device, including an in-vehicle computing device. The user device 104 and other components of the system 100 may communicate with the server system 100 using a network 106, such as the Internet. Where the device 104 is a mobile phone, the device 104 may connect to the network 106 using a cellular data connection or according to any other wireless protocol known in the art.

The server system 102 may execute a traffic mitigation module 108 implementing methods as described herein. The traffic mitigation module 108 may include a traffic monitoring module 110a that interfaces with one or more servers 112 to receive one or both of map data 116a and traffic data 116b from one or more databases 114 in order to determine the capacity of road segments and traffic densities on road segments over time. In particular, the current traffic density and available capacity may be determined from the map data 116a and traffic data 116b.

The map data 116a and traffic data 116b may be received from a navigation platform 112 such as WAZE, GOOGLE maps, UBER, or any other platform that directs drivers and therefore can report a likely location of a driver's vehicle. For example, a navigation platform may report where drivers are on routes that are being guided by the navigation platform and therefore indicate the contribution of the drivers of that navigation platform to traffic densities along these routes. The traffic data 116b may also be received from state or local departments of transportation that monitor signals from sensors at intersections and along roads for detecting passing vehicles and therefore can indicate current traffic density along various road segments.

The server system 102 may maintain a database 118 and store map data 120a and traffic data 120b as received from various server systems 112. In particular, data from multiple navigation platforms or government entities may be aggregated in the database 118. For example, patterns of traffic density over time may be calculated based on traffic data 116b received from the server systems 112. For example, traffic density on a road segment at a particular time and on a particular day of the week may be calculated by evaluating reported traffic density from the various server systems 112 and calculating an average traffic density on a road segment for that particular time and day of the week.

The traffic mitigation module 108 may further include a user characterization module 110b that maintains and uses a user history 120c. The user characterization module 110b receives notifications from an application executing on a user device 104 in order to characterize movements of the user to which to whom the device 104 belongs. The user characterization module 110b may further receive notifications from a vehicle belonging to the user either directly or by communicating with the application on the user device 104.

As described below, the user characterization module 110b attempts to understand behavior of the user in order to provide accurate departure times to maintain traffic density below a desired level. In particular, a typical time required to walk from the user's workspace to a parking structure may be calculated. A typical time required to walk from a living space to a parking location of the user's vehicle may be calculated. Other parameters, such as a route taken by the user to the freeway or other bottlenecks in a road system may be calculated based on observation of user behavior. A typical departure time from home or work for a given day of the week may also be calculated based on observation of user behavior.

The traffic mitigation module 108 may further include a distribution module 110c. A plurality of users of the system with desired departure times may be assigned suggested departure times that are distributed over time effective to maintain traffic density over road segments that are common to the routes of the plurality of users. The manner in which traffic density is calculated and its relationship to traffic speed is described below.

The traffic mitigation module 108 may further include an incentive module 110d. The incentive module 110d calculates fuel and time savings from leaving at the suggested departure times in order to provide an incentive for users. The incentive module 110d may also award points for leaving at departure times suggested by the distribution module 110c and manage the redemption of such points for rewards.

Figure 2:
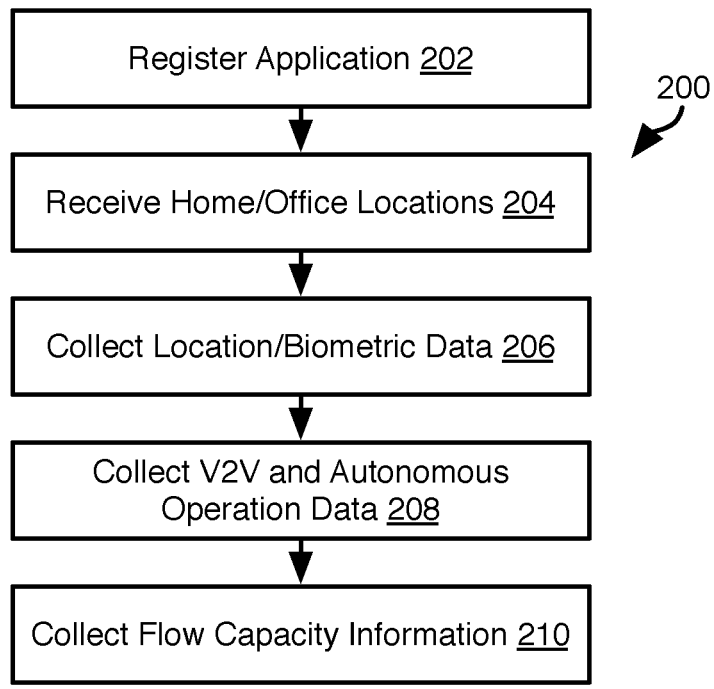
FIG. 2 is a process flow diagram of a method for collecting data for use in traffic mitigation, in accordance with one or more example embodiments of the present disclosure.

FIG. 2 illustrates a method 200 that may be executed by the server system 102 in order to gather information for mitigating traffic. The method 200 may include for a user of a plurality of users, registering 202 an application executing on a device 104 of the a user. For example, a user may download a client application for cooperating with the server system 102 in order to implement the methods disclosed herein. The user may then register the application with the server system 102 such as by providing a name, creating a user account, providing a username and password, or the like. In this manner, communications may be sent by the server system 102 to the client application of a specific user and data from a client application may be associated by the server system 102 with a specific user account to enable tracking and behavior characterization according to the methods described below. Registering 202 may further include registering one or more vehicles of the user, e.g. providing an identifier or otherwise uniquely associating the vehicle with user account. For example, the client application may establish a connection with the vehicle. The client application may therefore report to the server system 102 when electronic communication occurs thereby indicating proximity to the registered vehicle.

The method 200 may further include receiving 204 one or more additional items of information from the user such as locations of a work space, e.g. office, of a user and the user's home. These locations may be addresses or may be a GPS coordinate of a specific space, e.g. a room within a building where the office is located or a room in the user's home. As discussed below, this enables the tracking of a transit time from a work space or living space to the user's vehicle. The method 200 may further include receiving a make and model of the user's vehicle to enable calculation of fuel savings as discussed below.

The method 200 may further include collecting 206 one or both of location and biometric data. As discussed in detail below, the transit time of a user from a workspace to a vehicle may be used according to the methods described below. Accordingly, the client application may track movements of the user from the workspace to the vehicle. As noted, arrival at the vehicle may be detected by establishing an electronic connection to a vehicle registered for the user. Arrival may also be detected based on location, e.g., a GPS coordinate as detected by a GPS receiver in the user device that indicates location in a parking structure or parking lot. Biometric data may data available from health applications such as SAMSUNG H HEALTH or applications for operation with the health functionality in iOS provided by APPLE. These applications have access to the smartphone's pedometer and may record data such as heart rate and number of steps. In this manner, a user may have measure values for the number of steps between a point of origin and a destination, as well as a record of an average speed at which the user walks using the data recorded in this type of applications.

The method 200 may further include collecting 208 traffic data from one or more sources in order to characterize current traffic conditions or to determine typical traffic conditions at a given time of day and day of the week. For example, autonomous vehicles may report their movements and routes and these routes may be aggregated to determine their contribution to traffic along their routes. Likewise, autonomous or non-autonomous vehicles may be enabled to perform vehicle-to-vehicle (V2V) communication, such as using DSRC (dedicated short range communication) protocol. Accordingly, data communicated by V2V message from one vehicle to another or to roadside infrastructure may be collected. The information in a V2V may indicate the vehicles current location, speed and heading, which may be useful to characterize traffic speed and density at the vehicle's current location. V2V communications may include wireless signals. Collecting traffic data from vehicles using V2V communications may include an application receiving signals sent from a vehicle indicating traffic conditions. This way, devices may communicate with other vehicles to obtain information useful to determine traffic conditions and efficient driving routes.

The method 200 may further include collecting 210 flow capacity information from providers of navigation aids (GOOGLE MAPS, WAZE, UBER, etc.). Such platforms receive requests for navigation assistance and provide turn-by-turn directions and are therefore able to report the location, speed, and heading of vehicles. This data may then be used to determine traffic density at the location. Municipalities may operate sensors that report the number of vehicles passing a particular location and possibly the speed of the vehicles. Accordingly, the traffic density at a particular point be determined.

In addition to the sources of steps 208 and 210, users participating in the methods disclosed herein further report their speeds, locations, and headings on road segments and therefore provide an additional source of data.

By detecting the number of vehicles and their speed on a road segment according to some or all of the above-noted sources of traffic data, a characterization of the capacity of that road segment may be determined. In particular, as the number of vehicles passing over a road segment per unit time (the traffic density) increases, the speed of traffic generally slows down. By observing the relationship between the number of traffic density and speed of vehicles according to any of the above-noted sources, a capacity of the road may be determined. For example, the mathematical theory described below relates traffic speed and density to capacity.

Figure 3:
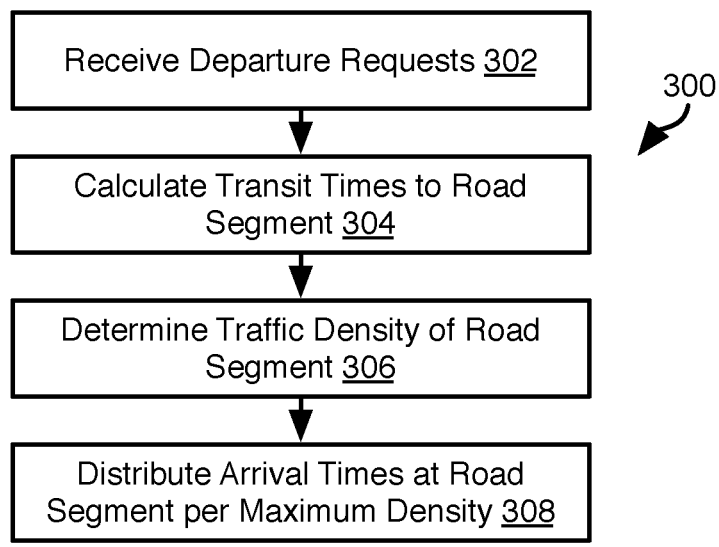
FIG. 3 is a process flow diagram of a method for mitigating traffic, in accordance with one or more example embodiments of the present disclosure.

Referring to FIG. 3, with a known capacity and a current traffic density (as measured or inferred from historical data), departure times of users may be distributed according to the illustrated method 300 in order to maintain traffic density below a threshold and thereby reduce the incidents of traffic jams and improve overall throughput of a road segment. The methods disclosed herein are particularly helpful for reducing traffic jams on highly-used road segments.

Accordingly, the method 300 may be executed with respect to a road segment that is known to be a bottleneck ("the bottleneck" as discussed below). For example, a section interstate highway or freeway that is highly used and is known to be congested at a given times of day, e.g. rush hour, may be selected to be the subject of the method 300. A road segment may be selected for processing according to the method 300 by a human operator or may be identified using the traffic data collected according to the method 300. For example, a road segment having an average speed during rush hour over an observation period (e.g., a week, month, or other period) that is some percentage less (e.g., 20-80 percent) than the speed limit governing it may be identified as a candidate for processing according to the method 300.

The method 300 may include receiving 302 a plurality of departure requests. A departure request may be associated with a user, such as by being received from a client application registered to an account of the user and executing on the device 104 of the user.

The departure request of a user may include some or all of a desired time of departure from a user's workspace, the location of the user's workspace, a desired destination (e.g., the user's home), route guidance (e.g., a desired route or a desired route segment), or the like. Note that all of the data defining a departure request may be inferred or retrieved from an account of the user. For example, the server system may infer a typical departure time of a user for every weekday or for a particular weekday based on observations of actual departures of the user as reported by the client application. Likewise, the workspace location and home location may be constant and be used for that user unless otherwise indicated by the user through the client application.

The method 300 may further include calculating 304 transit times for the users to the road segments. The transit time for a user to the road segment may include: an estimate of the time required to walk to the user's vehicle from the user's workspace (see discussion of FIG. 4, below) and a time required to drive a route to the start of the road segment. The time required to drive the route to the start of the road segment may take into account estimates of traffic along the route at the estimated time of traversal, e.g. starting at the time of arrival at the user's vehicle following the desired departure time. Where the desired departure time is close (e.g. within 20 minutes) of the current time, current traffic along the route may be used to determine the estimated time required to drive the route to the start of the road segment. Any approach known in the art for calculating an estimated traversal time of a route while taking into account traffic conditions may be used.

As a result of step 304, the desired departure time of a user may be converted to an arrival time at the start of the road segment, e.g. the departure time offset forward in time by the transit time from step 304.

The method 300 may further include determining 306 an expected or current traffic density along the road segment. An expected traffic density at a given arrival time may be determined using the traffic data collected according to the method 200. For example, the average traffic density on the road segment for the time of day and day of the week of the arrival time. Where the arrival time is not far removed from the current time (e.g., within 20 minutes), the current traffic density on the road segment may be used.

The method 300 may include distributing 308 the arrival times at the road segment such that the traffic density on the road segment remains below a maximum density, e.g. a predetermined value between 80 and 90 percent.

In particular, the desired arrival times may have their own distribution. The arrival times may be changed to adjusted times such that users arriving at the start of the road segment per unit time plus the estimated traffic density (current or inferred from historical measurements) does not exceed the maximum density. Note that in many cases a fraction of drivers will use the client application and participate in the methods disclosed herein. Accordingly, non-participating traffic may result in the maximum density being exceeded during a period. Accordingly, the distribution may avoid placing adjusted arrival times during those periods where the maximum density is already exceeded by the estimated traffic density from step 306. As participation increases, traffic density will be reduced to below the maximum density such that the estimated traffic density will begin to conform to an expect density according to the distribution of the adjusted times.

In general, the distribution of step 308 will spread the adjusted times over a greater period of time and reduce the maximum number of arrivals per unit time in order to reduce the traffic density to below the maximum density. Accordingly, where the arrival times exhibit a maximum number of arrivals per unit time during a particular time window ("the peak time"), those arrival times before the peak time may be moved earlier and those arrival times after the peak time may be moved later. Those within the peak time window may likewise be distributed forward and backward in time to reduce traffic density.

The adjustment of arrival times will be determined based on the position of a vehicle, the speed that it takes to reach the road segment, the density of the traffic and the flow speed of traffic on the road segment. In this manner, the time it will take a particular vehicle to reach a particular location on the road segment may be calculated. Accordingly, the rate of arrival of vehicles at the road segment may be adjusted in order to feed more or less vehicles in the road segment over time.

In some embodiments, the algorithm may assign a constant speed to a driver. It may then be assumed that a driver maintains a constant speed indicated by the application, particularly autonomous vehicles. The algorithm may then assign vehicles to enter the road segment in a particular time interval based on the flow and density of traffic that can accept per second based on current or inferred traffic density. Aided by V2V communications, the algorithm make adjustments at junctions and with respect to lanes in order to require a flow and a constant speed for the entry and exit of vehicles and thereby prevent bottlenecks and obstruction at the exits.

Once this has been analyzed, if the density increases, the required speed will be decreased and the user will be informed of a time adjustment. These adjustments will be due to the fact that, when assigning your departure itinerary, the density and quantity of vehicles assigned is exceeded by the calculated traffic density factor.

Figure 4:
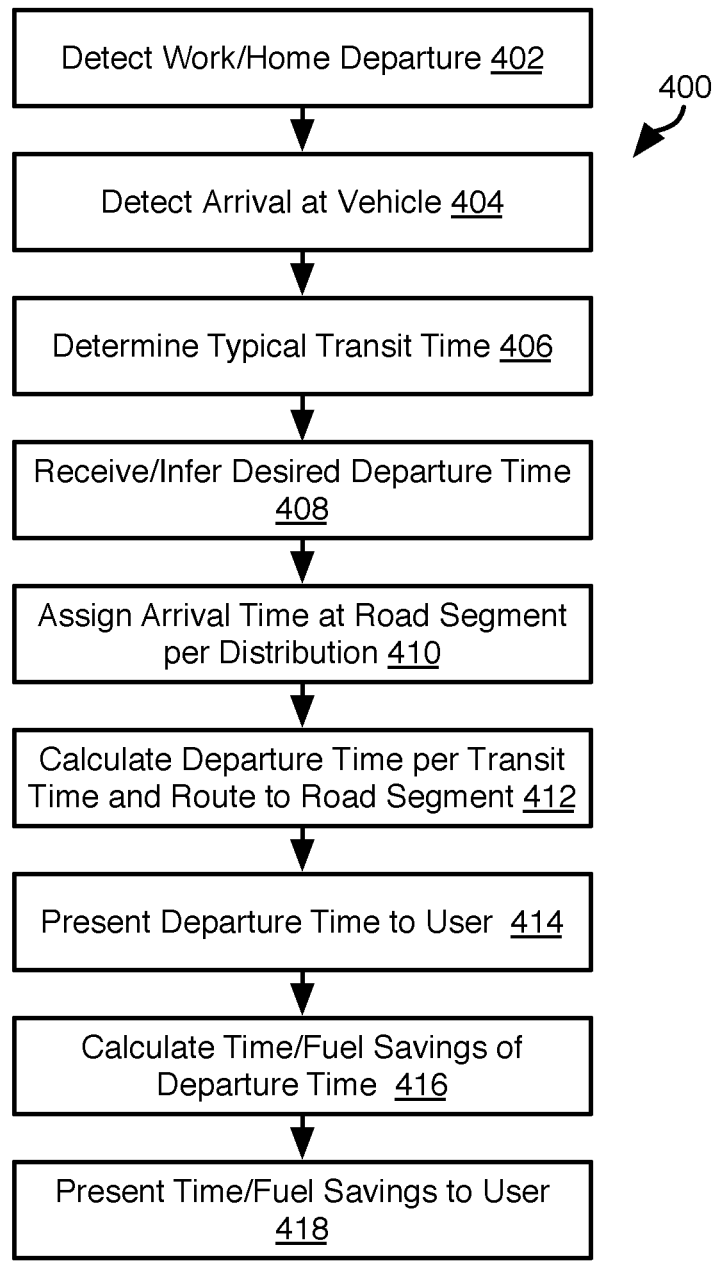
FIG. 4 is a process flow diagram of a method for providing departure recommendations to a user for traffic mitigation, in accordance with one or more example embodiments of the present disclosure.

FIG. 4 illustrates a method 400 for interfacing with a user by means of a client application executing on the user device 104 of the user. The method 400 may include repeatedly detecting 402 times of departure from a workspace and detecting a subsequent times of arrival at the user's vehicle. The method 400 may further include repeatedly detecting 404 times of departure from a living space and subsequent times of arrival at the user's vehicle. The manner in which departure and arrivals are detected is discussed above. For a departure time from a location (living space or work space) and a subsequent arrival time at the vehicle, a difference is calculated. The differences for the location may then be averaged to determine 406 an average transit time from the location to the vehicle. Steps 402-406 may be repeated over time such that the time differences used to calculate the transit time increases and becomes more accurate with each iteration of the method 400.

The method 400 may then include receiving or inferring 408 a desired departure time and assigning 410 an adjusted arrival time at the road segment to the user according to a distribution. A suggested departure time corresponding to the adjusted arrival time of a user may be calculated 412 based on the estimates of transit time to the vehicle and the transit time traversing a route to the road segment may also be calculated. In particular, the adjusted arrival time may be moved forward in time by the transit time (walking to vehicle and driving route to road segment). The adjusted arrival times and desired departure times as used according to steps 408 and 410 may be determined in the manner described above with respect to steps 302-308 of the method 300.

The method 400 may then include presenting 414 the suggested departure time from step 412. For example, the server system 102 may transmit the suggested departure time to the device 104 of the user, such as to the client application on the device 104 of the user. The device 104 of the user may then display the suggested departure time to the user device 104, such as according to instructions from the client application.

The method 400 may further include calculating 416 one or both of a time savings and a fuel savings to the user from following the suggested departure time. For example, an original distribution of the distribution of arrival times at the road segment may be obtained using the departure times received or inferred for the plurality of users. In particular, the arrival time of a user would be the original departure time plus the transit time to the road segment if starting at the original departure time. The transit time may be calculated as described above.

Using the original distribution of arrival times, an expected traffic density along the road segment over time may be inferred based on the traffic added by the arrival times superimposed on estimated or current traffic on the road segment. Using the expected traffic density along the road segment over time, the traffic speed along the segment over time may also be determined. Accordingly, the user's speed while traversing the road segment may be inferred based on the time of arrival at the road segment and the expected traffic speed at that time and throughout the time of traversal of the road segment. By evaluating the expected traffic speed at points along the road segment, the expected time of traversal of the road segment may be inferred.

In a like manner, for the velocity of the vehicle while traversing the road segment, the fuel consumption of the user's vehicle may be calculated, such as based on a make and model of the vehicle provided by the user through the client application.

The expected elapsed time and fuel consumption of the users if the suggested departure times are followed may also be calculated in an identical manner by substituting the suggested departure times for the original departure times received from or inferred for the users in the calculations above.

A time savings of a user that is a difference between the time of traversal for the original departure time and the time of traversal for the suggested departure time of the user may be calculated. Likewise, a time savings of a user that is a difference between the fuel consumption for the original departure time and the fuel consumption for the suggested departure time of the user may be calculated.

To calculate the fuel consumption, the vehicle performance data will be required, such as fuel efficiency data given by the manufacturer. The number of passengers and some vehicle data may also be taken into account, such as tire pressure and telemetry, in order to make the calculation more accurate. Once these data are available, the ideal consumed fuel calculated with the distance to be traveled may then be calculated first. This may be performed using any algorithm for calculating fuel consumption based on distance and speed know in the art.

Some have systems that indicate the fuel consumption based on distance traveled, in this case fuel consumption of the vehicles of users of the client application may be monitored. Known approaches for calculating fuel consumption per unit time may be used to relate these measurements to fuel consumption.

For example, for a given power (e.g., horsepower) divided by the number of cylinders of the engine, there is an approximate calculation of the cost in liters of fuel per hour. For example, a vehicle that has 230 hp, and four cylinders: 230/4=57.5 Liters/hour. As: 1 Liter=0.2642 Gallons. Results: 57.5×0.2642=15.1915 Gallons/hour. Accordingly, the vehicle can be approximated to use about 15 gallons per hour.

There will be an initial amount of fuel and a final amount of fuel, because the transit time and implementation a fuel consumption calculation algorithm may be adaptive. For example, the algorithm may monitor fuel consumption data in the time it takes the vehicle to reach its destination without making use of the proposed application. The algorithm may then make a comparison between the ideal consumption based on distance, the ideal consumption base on time, and the consumption detected by the vehicle in multiple ranges of traffic density, e.g. low, medium, high, and excessive traffic density. The density may be determined using any formula for characterizing traffic density known in the art. In particular, one may set traffic density thresholds defining the bounds of a range of traffic densities. In this way, one can make a comparison of fuel consumption under these conditions and can indicate to the user what the consumption will be if they do not follow the suggested departure time. In particular, if failure to follow the suggested departure time would result in traversal of the road segment in high traffic density rather than low traffic density, the difference in expected fuel consumptions over the road segment for these traffic density ranges may be computed in order to determine the fuel savings the user would be expected to receive.

The method 400 may then include presenting 418 the time and fuel savings of a user to the user, such as by transmitting the time and fuel savings of a user to the client application executing on the device 104 of the user. The client application may then display the time and fuel savings to the user. For example, the server system 102 may push a notification to the device 104 that invokes a visual or audible alert showing the time and fuel savings, e.g. "By leaving at [suggested departure time] you will save [time savings] minutes and [fuel savings] gallons of gas."

Following the suggested departure time may be incentivized. For example, upon detecting departure of the user from a workspace or living space at the suggested departure time followed by arrival at the user's vehicle within some tolerance of the expected transit time, followed by proceeding to the road segment, points may be awarded to the user. Tracking may be performed by tracking the user's device 104, such as by receiving reports of the device's location by way of the client application on the device 104. Points may be redeemable for real-world products, services, discounts, awards, or other tangible or intangible items that may motivate the user. The award and redemption of points may be according to any point-based incentive program known in the art.

The relationship between traffic speed and traffic density for various traffic conditions and road configurations (e.g., intersections, traffic lights, other road structures) may be understood using equations and relationships included in the following reference that is hereby incorporated herein by reference in its entirety: Book Reference: Mannering and Washburn, *Principles of Highway Engineering and Traffic Analysis*, (5$^{th}$ Edition, 2011), Wiley.

Figure 5:
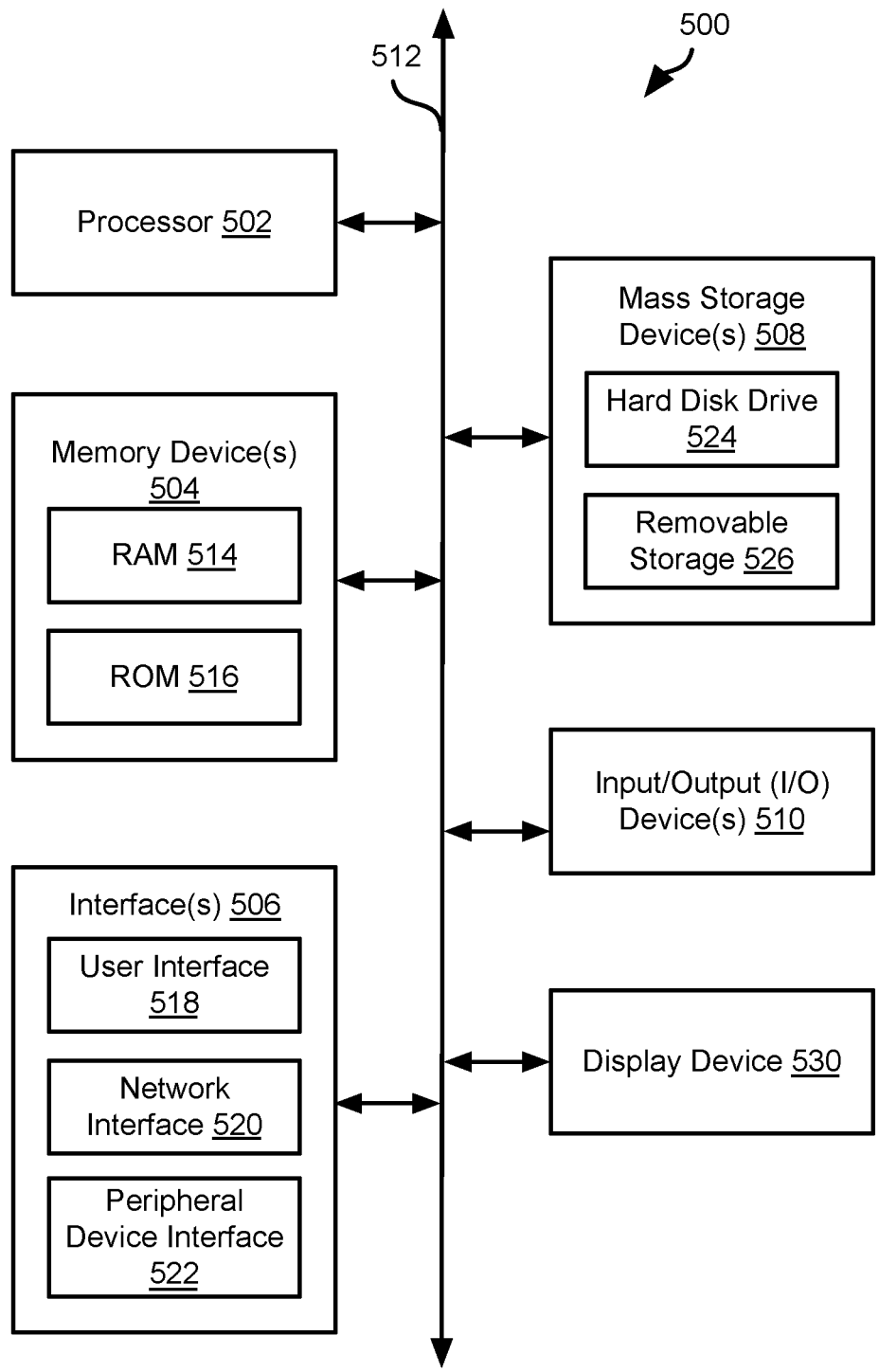
FIG. 5 is a schematic block diagram of an example computing device suitable for implementing methods, in accordance with one or more example embodiments of the present disclosure.

FIG. 5 is a block diagram illustrating an example computing device 500. Computing device 500 may be used to perform various procedures, such as those discussed herein. One or more computing devices 500 may be used to implement the server system 102 and be programmed to execute the methods disclosed herein.

Computing device 500 includes one or more processor(s) 502, one or more memory device(s) 504, one or more interface(s) 506, one or more mass storage device(s) 508, one or more input/output (I/O) device(s) 511, and a display device 530 all of which are coupled to a bus 512. Processor(s) 502 include one or more processors or controllers that execute instructions stored in memory device(s) 504 and/or mass storage device(s) 508. Processor(s) 502 may also include various types of computer-readable media, such as cache memory.

Memory device(s) 504 include various computer-readable media, such as volatile memory (e.g., random access memory (RAM) 514) and/or nonvolatile memory (e.g., read-only memory (ROM) 516). Memory device(s) 504 may also include rewritable ROM, such as Flash memory.

Mass storage device(s) 508 include various computer readable media, such as magnetic tapes, magnetic disks, optical disks, solid-state memory (e.g., Flash memory), and so forth. As shown in FIG. 5, a particular mass storage device is a hard disk drive 524. Various drives may also be included in mass storage device(s) 508 to enable reading from and/or writing to the various computer readable media. Mass storage device(s) 508 include removable media 526 and/or non-removable media.

I/O device(s) 510 include various devices that allow data and/or other information to be input to or retrieved from computing device 500. Example I/O device(s) 510 include cursor control devices, keyboards, keypads, microphones, monitors or other display devices, speakers, printers, network interface cards, modems, lenses, CCDs or other image capture devices, and the like.

Display device 530 includes any type of device capable of displaying information to one or more users of computing device 500. Examples of display device 530 include a monitor, display terminal, video projection device, and the like.

Interface(s) 506 include various interfaces that allow computing device 500 to interact with other systems, devices, or computing environments. Example interface(s) 506 include any number of different network interfaces 520, such as interfaces to local area networks (LANs), wide area networks (WANs), wireless networks, and the Internet. Other interface(s) include user interface 518 and peripheral device interface 522. The interface(s) 506 may also include one or more peripheral interfaces such as interfaces for printers, pointing devices (mice, track pad, etc.), keyboards, and the like.

Bus 512 allows processor(s) 502, memory device(s) 504, interface(s) 506, mass storage device(s) 508, I/O device(s) 510, and display device 530 to communicate with one another, as well as other devices or components coupled to bus 512. Bus 512 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 500, and are executed by processor(s) 502. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

Some embodiments may be used in various other devices, systems, and/or networks.

Example 1 may be a method comprising, by a computer system: determining one or more indications of desired departure times and routes for a first user and a second user of a group of users, the routes including a road segment used by the first user and the second user; determining a first signal received from a computer of a first vehicle and a second signal from a computer of a second vehicle, wherein the first user is associated with the first vehicle, wherein the second user is associated with the second vehicle, wherein the first signal indicates traffic associated with the first vehicle, and wherein the second signal indicates traffic associated with the second vehicle; determining, based at least in part on the first signal and the second signal, a first suggested departure time associated with the first user and a second suggested departure time associated with the second user, wherein the first suggested departure time and the second suggested departure are based at least in part on maintaining a traffic density on the road segment below a threshold; causing to send an indication of the first suggested departure time; and causing to send an indication of the second suggested departure.

Example 2 may include the method of example 1 and/or some other example herein, wherein causing to send the indication of the first suggested departure time comprises causing to send the indication of the first suggested departure time to the computer of the first vehicle.

Example 3 may include the method of example 1 and/or some other example herein, wherein causing to send the indication of the first suggested departure time comprises causing to send the indication of the first suggested departure time to a user device associated with the first user, wherein the user device is different than the computer of the first vehicle.

Example 4 may include the method of example 1 and/or some other example herein, wherein determining the first suggested departure time includes: generating a distribution of arrival times at the road segment; determining a transit time from the first user's departure location to a start of the road segment; and determining the first suggested departure time based at least in part on the transit time.

Example 5 may include the method of example 1 and/or some other example herein, further comprising determining an indication of a walking time from a current location of the first user to a location of the first vehicle, wherein the first suggested departure time is further based on the walking time.

Example 6 may include the method of example 1 and/or some other example herein, wherein an indication of a desired departure time associated with the first user is received from a user device associated with the first user.

Example 7 may include the method of example 1 and/or some other example herein, wherein an indication of a desired departure time associated with the first user is received from the computer of the first vehicle.

Example 8 may include the method of example 1 and/or some other example herein, further comprising determining, based at least in part on the traffic associated with the first vehicle and the traffic associated with the second vehicle, a capacity of the road segment, wherein the threshold is associated with the capacity.

Example 9 may include the method of example 1 and/or some other example herein, further comprising: determining biometric data associated with the first user; and determining the first suggested departure time based at least in part on the biometric data.

Example 10 may include the method of example 1 and/or some other example herein, further comprising: determining a fuel savings associated with the first suggested departure time; and causing to send an indication of the fuel savings.

Example 11 may include a system comprising one or more processing devices and one or more memory devices operably coupled to the one or more processing devices, the one or more memory devices storing executable code effective to cause the one or more processing devices to: determining one or more indications of desired departure times and routes for a first user and a second user of a group of users, the routes including a road segment used by the first user and the second user; determine a first signal received from a computer of a first vehicle and a second signal from a computer of a second vehicle, wherein the first user is associated with the first vehicle, wherein the second user is associated with the second vehicle, wherein the first signal indicates traffic associated with the first vehicle, and wherein the second signal indicates traffic associated with the second vehicle; determine, based at least in part on the first signal and the second signal, a first suggested departure time associated with the first user and a second suggested departure time associated with the second user, wherein the first suggested departure time and the second suggested departure are based at least in part on maintaining a traffic density on the road segment below a threshold; cause to send an indication of the first suggested departure time; and cause to send an indication of the second suggested departure.

Example 12 may include the system of example 11 and/or some other example herein, wherein to cause to send the indication of the first suggested departure time comprises to cause to send the indication of the first suggested departure time to the computer of the first vehicle.

Example 13 may include the system of example 11 and/or some other example herein, wherein to cause to send the indication of the first suggested departure time comprises to cause to send the indication of the first suggested departure time to a user device associated with the first user, wherein the user device is different than the computer of the first vehicle.

Example 14 may include the system of example 11 and/or some other example herein, wherein to determine the first suggested departure time includes: to generate a distribution of arrival times at the road segment; to determine a transit time from the first user's departure location to a start of the road segment; and determine the first suggested departure time based at least in part on the transit time.

Example 15 may include the system of example 11 and/or some other example herein, wherein the executable code is further effective to cause the one or more processing devices to determine an indication of a walking time from a current location of the first user to a location of the first vehicle, wherein the first suggested departure time is further based on the walking time.

Example 16 may include the system of example 11 and/or some other example herein, wherein an indication of a desired departure time associated with the first user is received from a user device associated with the first user.

Example 17 may include the system of example 11 and/or some other example herein, wherein an indication of a desired departure time associated with the first user is received from the computer of the first vehicle.

Example 18 may include the system of example 11 and/or some other example herein, wherein the executable code is further effective to cause the one or more processing devices to determine, based at least in part on the traffic associated with the first vehicle and the traffic associated with the second vehicle, a capacity of the road segment, wherein the threshold is associated with the capacity.

Example 19 may include the system of example 11 and/or some other example herein, wherein the executable code is further effective to cause the one or more processing devices to: determine biometric data associated with the first user; and determine the first suggested departure time based at least in part on the biometric data.

Example 20 may include a device comprising memory and processing circuitry configured to: determining one or more indications of desired departure times and routes for a first user and a second user of a group of users, the routes including a road segment used by the first user and the second user; determining a first signal received from a computer of a first vehicle and a second signal from a computer of a second vehicle, wherein the first user is associated with the first vehicle, wherein the second user is associated with the second vehicle, wherein the first signal indicates traffic associated with the first vehicle, and wherein the second signal indicates traffic associated with the second vehicle; determine, based at least in part on the first signal and the second signal, a first suggested departure time associated with the first user and a second suggested departure time associated with the second user, wherein the first suggested departure time and the second suggested departure are based at least in part on maintaining a traffic density on the road segment below a threshold; cause to send an indication of the first suggested departure time; and cause to send an indication of the second suggested departure.

Example 21 may include an apparatus comprising means for performing the method of any one of examples 1-10.

Example 22 may include one or more non-transitory computer-readable media comprising instructions to cause an electronic device, upon execution of the instructions by one or more processors of the electronic device, to perform one or more elements of a method described in or related to any of examples 1-10, or any other method or process described herein Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed is:

1. A method comprising, by a computer system:
   receiving a request to complete a first navigational route for a first user associated with a first vehicle using a first departure time, the first navigational route including a high traffic density road segment, wherein the first departure time would result in the first user navigating the high traffic density road segment at a second time;
   receiving a request to complete a second navigational route for a second user associated with a second vehicle, the second navigational route also including the high traffic density road segment;
   determining that a traffic density at the high traffic density road segment will be below a threshold traffic density at the second time;
   causing, based on the determination that the traffic density at the high traffic density road segment will be below the threshold traffic density at the second time, to send an indication of a first suggested departure time for the first user, the first suggested departure time being the first departure time;
   determining, subsequent to causing to send the indication of the first suggested departure time for the first user, that the traffic density at the high traffic density road segment will be at or above the threshold traffic density at the second time; and
   causing to send an indication of a second suggested departure time for the second user, wherein the second suggested departure time would result in the second user navigating the high traffic density road segment at a third time, wherein the third time is different than the second time, and wherein the traffic density at the high traffic density road segment will be below the threshold traffic density at the third time.

2. The method of claim 1, wherein causing to send the indication of the first suggested departure time comprises causing to send the indication of the first suggested departure time to at least one of: the first vehicle or a user device associated with the first user, wherein the user device is different than a computer of the first vehicle.

3. The method of claim 1, wherein determining the first suggested departure time includes:
   generating a distribution of arrival times at the high traffic density road segment;
   determining a transit time from a departure location of the first user to a start of the high traffic density road segment; and
   determining the first suggested departure time based at least in part on the transit time.

4. The method of claim 1, further comprising determining an indication of a walking time from a current location of the first user to a location of the first vehicle, wherein the first suggested departure time is further based on the walking time.

5. The method of claim 1, wherein an indication of a desired departure time associated with the first user is received from a user device associated with the first user.

6. The method of claim 1, wherein an indication of a desired departure time associated with the first user is received from a computer of the first vehicle.

7. The method of claim 1, further comprising determining a capacity of the high traffic density road segment, wherein the threshold traffic density is associated with the capacity.

8. The method of claim 1, further comprising:
determining biometric data associated with the first user; and
determining the first suggested departure time based at least in part on the biometric data.

9. The method of claim 1, further comprising:
determining a fuel savings associated with the first suggested departure time; and
causing to send an indication of the fuel savings.

10. A system comprising one or more processing devices and one or more memory devices operably coupled to the one or more processing devices, the one or more memory devices storing executable code effective to cause the one or more processing devices to:
receive a request to complete a first navigational route for a first user associated with a first vehicle using a first departure time, the first navigational route including a high traffic density road segment, wherein the first departure time would result in the first user navigating the high traffic density road segment at a second time;
receive a request to complete a second navigational route for a second user associated with a second vehicle, the second navigational route also including the high traffic density road segment;
determine that a traffic density at the high traffic density road segment will be below a threshold traffic density at the second time;
cause, based on the determination that the traffic density at the high traffic density road segment will be below the threshold traffic density at the second time, to send an indication of a first suggested departure time for the first user, the first suggested departure time being the first departure time;
determine, subsequent to causing to send the indication of the first suggested departure time for the first user, that the traffic density at the high traffic density road segment will be at or above the threshold traffic density at the second time; and
cause to send an indication of a second suggested departure time for the second user, wherein the second suggested departure time would result in the second user navigating the high traffic density road segment at a third time, wherein the third time is different than the second time, and wherein the traffic density at the high traffic density road segment will be below the threshold traffic density at the third time.

11. The system of claim 10, wherein to cause to send the indication of the first suggested departure time comprises to cause to send the indication of the first suggested departure time to at least one of: the first vehicle or a user device associated with the first user, wherein the user device is different than a computer of the first vehicle.

12. The system of claim 10, wherein to determine the first suggested departure time includes:
to generate a distribution of arrival times at the high traffic density road segment;
to determine a transit time a departure location of the first user to a start of the high traffic density road segment; and
determine the first suggested departure time based at least in part on the transit time.

13. The system of claim 10, wherein the executable code is further effective to cause the one or more processing devices to determine an indication of a walking time from a current location of the first user to a location of the first vehicle, wherein the first suggested departure time is further based on the walking time.

14. The system of claim 10, wherein an indication of a desired departure time associated with the first user is received from a user device associated with the first user.

15. The system of claim 10, wherein an indication of a desired departure time associated with the first user is received from a computer of the first vehicle.

16. The system of claim 10, wherein the executable code is further effective to cause the one or more processing devices to determine a capacity of the high traffic density road segment, wherein the threshold traffic density is associated with the capacity.

17. The system of claim 10, wherein the executable code is further effective to cause the one or more processing devices to:
determine biometric data associated with the first user; and
determine the first suggested departure time based at least in part on the biometric data.

18. A device comprising memory and processing circuitry configured to:
receive a request to complete a first navigational route for a first user associated with a first vehicle using a first departure time, the first navigational route including a high traffic density road segment, wherein the first departure time would result in the first user navigating the high traffic density road segment at a second time;
receive a request to complete a second navigational route for a second user associated with a second vehicle, the second navigational route also including the high traffic density road segment;
determine that a traffic density at the high traffic density road segment will be below a threshold traffic density at the second time;
cause, based on the determination that the traffic density at the high traffic density road segment will be below the threshold traffic density at the second time, to send an indication of a first suggested departure time for the first user, the first suggested departure time being the first departure time;
determine, subsequent to causing to send the indication of the first suggested departure time for the first user, that the traffic density at the high traffic density road segment will be at or above the threshold traffic density at the second time; and
cause to send an indication of a second suggested departure time for the second user, wherein the second suggested departure time would result in the second user navigating the high traffic density road segment at a third time, wherein the third time is different than the second time, and wherein the traffic density at the high traffic density road segment will be below the threshold traffic density at the third time.

19. The method of claim 1, further comprising:
determining that a third user associated with a third vehicle will be navigating the high traffic density road segment at the second time; and causing to send, based on the determination that the third user associated with a third vehicle will be navigating the high traffic density road segment at the second time, an indication to reduce a speed of the third vehicle.

20. The method of claim 1, wherein determining that the traffic density at the high traffic density road segment will be at or above the threshold traffic density at the second time takes place subsequent to causing to send the indication of the first suggested departure time for the first user.

* * * * *